United States Patent [19]

Youjun et al.

[11] Patent Number: 4,762,104
[45] Date of Patent: Aug. 9, 1988

[54] TJ-JET CHAMBER OF GASOLINE ENGINE

[75] Inventors: Liu Youjun; Shang Xiujing; Liu Yinlong; Wan Shixiong; Liu Jieping, all of Tianjin, China

[73] Assignee: Tianjin University, Tianjin, China

[21] Appl. No.: 790,441

[22] Filed: Oct. 23, 1985

[51] Int. Cl.[4] ............................................. F02B 19/18
[52] U.S. Cl. ..................................... 123/293; 123/262
[58] Field of Search ............... 123/262, 263, 283, 286, 123/293

[56] References Cited

U.S. PATENT DOCUMENTS

| | | | |
|---|---|---|---|
| 1,597,248 | 8/1926 | Rathbun | 123/283 X |
| 1,875,589 | 9/1932 | Good | 123/262 X |
| 1,892,129 | 12/1932 | Barkeij | 123/262 |
| 2,652,039 | 9/1953 | Weslake | 123/262 X |
| 2,799,257 | 7/1957 | Stumpfig et al. | 123/286 X |
| 2,980,094 | 4/1961 | Müller | 123/286 |
| 4,181,102 | 1/1980 | Yagi et al. | 123/293 X |
| 4,442,807 | 4/1984 | Latsch et al. | 123/293 X |

Primary Examiner—Willis R. Wolfe, Jr.
Attorney, Agent, or Firm—Cushman, Darby & Cushman

[57] ABSTRACT

A combustion chamber with a number of jet hole bores that communicate with the clearance space of the cylinder of an internal combustion engine. When the carburated mixture in the combustion chamber is ignited, the flame front bifurcates into a first portion that enters the clearance space from the combustion chamber through a main opening, and a second flame front that enters the clearance space through the jet holes. The flame fronts violently collide in the clearance space, ensuring complete burning of the carburated mixture.

3 Claims, 2 Drawing Sheets

TJ-JET CHAMBER OF GASOLINE ENGINE

BACKGROUND OF THE INVENTION

The present invention relates to a combustion chamber for a gasoline engine.

The optimization of the performance of such engines is of great importance in today's energy conscious society. In the part century, researchers in the People's Republic of China and elsewhere have strived to attain that goal, with varying degrees of success.

The use of unleaded gasoline in modern automobile engines has greatly reduced the compression ratio that may be used in the design of such engines, because the absence of tetraethyl lead in the gasoline sometimes causes destructive detonation to occur in the combustion chamber of such engines at a lower pressure. At present, the compression ratio of common gasoline engines used in automobilies in countries other than the People's Republic of China, while using unleaded gasoline (RON value-90 through 93), is about 8.5 to 9.0. Their average engine performance is substantially as follows:

minimum specific fuel consumption - 200 to 205 gms/H.P. per hour.

maximum Mean Effective Pressure - 9 to 9.5 kg/cm$^2$.

Attempts have been made in the prior art to improve engine performance over the values set forth above. Several such attempts that have been made are discussed in:

1. The May Fireball Chamber that was developed in Switzerland, as is discussed in SAE papers, Series No. 790386 and 810786.
2. The British High Compression Ratio Compact Chamber produced by Ricardo Ltd., as described in SAE papers, Series No. 820166, and AE Journal, February through March 1982.
3. The Top Chamber produced by Porsche Company in the Federal Republic of Germany, as disclosed in the MTZ Journal, May 1984.

Among the prior art combustion chamber which have been discussed above are:

4. The MCA-Jet Combustion Chamber developed by Mitsubishi Company in Japan; please refer to "Automotive Engineering" Journal April 1984.
5. The Tornado Chamber developed by Danish University; please refer to SAE papers, Series No. 810786.
6. The Audi Combustion System in the Federal Republic of Germany; please refer to West German "Automobil Industrie" Journal issues 1-3 1982.

The above-mentioned prior art combustion chambers have been put into trial production. Their performances are superior. However, their engines require the use of premium gasoline, which has a high octane number and requires quite a bit of energy to refine. In view of the modern need to conserve energy, it is a disadvantage of such prior art devices that they require the use of premium gasoline.

SUMMARY OF THE INVENTION

The primary object of the present invention is to decrease the specific fuel consumption in automobile gasoline engines, thereby increasing their economy and saving energy, while using a lower octane number gasoline. The present invention allows gasoline engines having a relatively high compression ratio to be run on a gasoline that is equivalent to the People's Republic of China domestic No. 70 grade regular gasoline, RON 86.

Accordingly, the combustion chamber of a gasoline engine according to the present invention burns a leaner gas mixture, which helps to reduce the specific fuel consumption. In addition, it has been proved in theory and practice that an increase in the compression ratio of a gasoline engine is an effective means to decrease its specific fuel consumption. The compression ratio is generally limited by the octane number of the fuel, otherwise it may cause abnormal combustion or detonation in the combustion chamber which would cause serious damage to the gasoline engine.

The present invention proposes a new structure for a combustion chamber. As a result of the novel structure described herein, it is possible to suppress detonation inside the combustion chamber, overcome the difficulties created by the increase in compression ratio and further optimize the performance of the gasoline engine.

DETAILED DESCRIPTION OF THE PREFERRED EMBODIMENT OF THE PRESENT INVENTION

Figure 1:
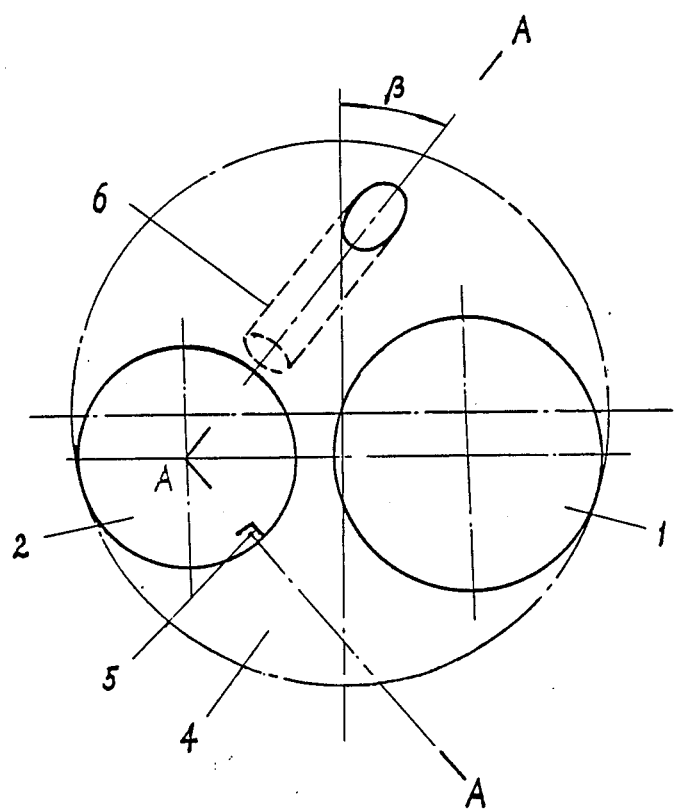
FIG. 1 is a top view of the cylinder head assembly according to the present invention.
Figure 2:
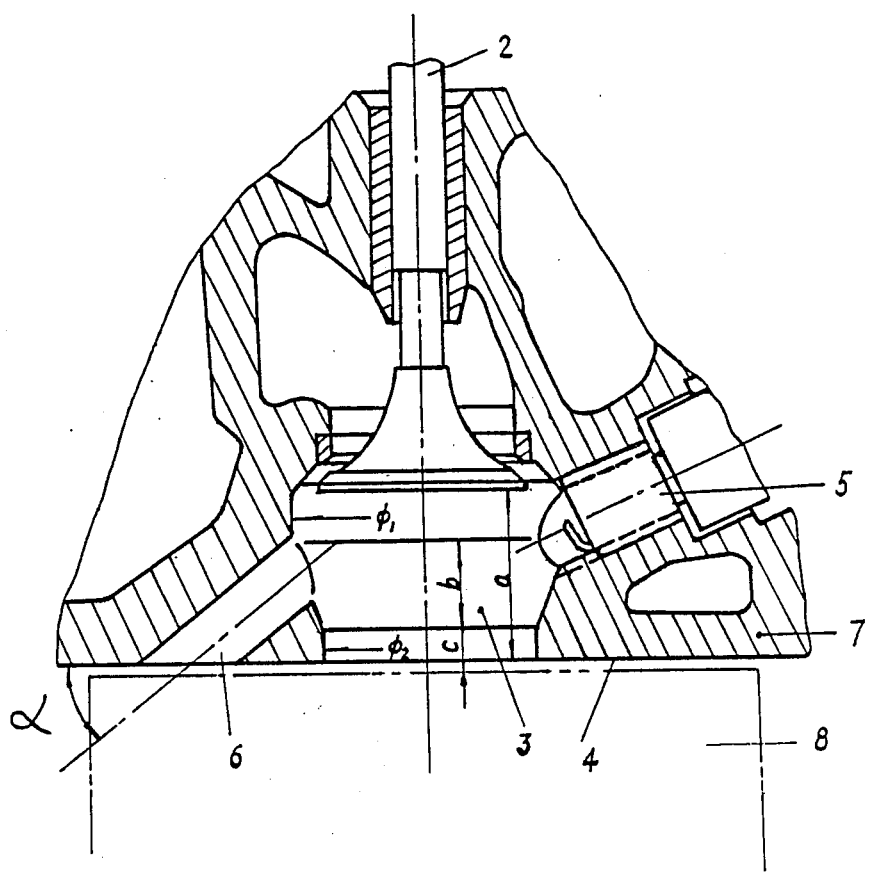
FIG. 2 is a cross-sectional view of the cylinder head assembly according to the present invention taken along section a in FIG. 1.

The cylinder head assembly according to the present invention is a breakthrough over the conventional structure commonly used in combustion chambers of gasoline engines. It consists of several parts, including a cylinder head 7 having an intake valve 1 and an exhaust valve 2 therein, a combustion chamber 3 defined in the cylinder head, a spark plug 5 for causing combustion in the combustion chamber and a jet hole bore 6 in the cylinder head. The jet hole bore 6 communicates the combustion chamber to a clearance space 4 provided in the cylinder space of an engine block which has a piston 8 reciprocable therein. As is shown in FIG. 1 and FIG. 2, combustion chamber 3 is disposed in the cylinder head, located under the exhaust valve 2. The combustion chamber is formed in the shape of a cylinder. On the side wall of combustion chamber 3 there exists a special jet hole 6. The number of jet holes 6, their position and their size are all of crucial importance for the engine's performance, but optimization of those factors is dependent on the diameter of the cylinder and the stroke of the piston.

During the upward motion of the piston 8 during the compression stroke before the burning of the fuel, and during expansion of gas after buring, a strong microscale turbulence is formed in the combustion chamber 3 and clearance chamber 4. Specifically, when spark plug 5 is fired after the compression stroke, the flame caused thereby radiates into combustion chamber 3, and then downward through an opening into the clearance chamber 4.

Simultaneously, a second path of flame proceeds from the combustion chamber 3 through the jet hole 6 and into the clearance chamber 4. A great deal of microscale turbulance is created when the two flame fronts collide within the clearance chamber 4, thus ensuring efficient and complete burning of the air-fuel mixture.

A great deal of microscale turbulence can be produced through the jet hole. Because of the resulting turbulence, the flame propagation speed is also raised so that is may reach the farthest end of the clearance space from the spark plug at a higher speed than heretofore possible. The effect of such rapid propagation is that harmful detonation or knocking is suppressed.

Additionally, in later periods of combustion, the rate of heat released from the burning of the fuel is extremely fast in comparison with prior art engines.

For example, if a gasoline engine model 492Q common in the People's Republic is changed over to the TJ-jet chamber while burning RON 86 gasoline, the compression ratio can be increased from 7.2 to 10; the lowest specific fuel consumption becomes 180 gms/H.P. per hour and the maximum Mean Effective Pressure (MEP) is increased to 9.7 kg/cm$^2$. In other words, the performance of that pedestrian engine has been increased to a level comparable with some of the most advanced engines in the world.

The changes of the shape of the combustion chamber 3 and the position of the spark plug with respect to the jet holes 6 both play an active role to optimize the performance of the engine. The most important factor in the optimization of engine performance according to the present invention remains the jet holes. The upper end of the center of the jet hole is opposite the exhaust valve 2 and the lower end of its center is farthest from the spark plug. Its main roles are as follows:

1. By means of the compression caused by the piston, a great deal of microscale turbulence is formed around the spark plug, which is of benefit to ignition.

2. The mixed gases are in ignition after the flame propagates outwardly through the jet holes and the flame front can swiftly be lead to the region of the probable detonation center, so as to suppress any possible detonation.

3. Inside the combustion chamber 3, the higher the compression ratio or load is, the stronger the intensity becomes, the finer microscale turbulence caused by the jet holes becomes, therefore the propagation speed of the flame increases. All of the above-mentioned functions are active in suppressing detonation, which is always more likely to occur during periods of high load, and in engines having higher compression ratios.

4. Through the jet hole microscale turbulance is produced inside the main chamber, as soon as the flame front reaches the chamber so that the flame may travel at a high rate of speed.

5. In the course of combustion, through the jet holes there are formed two separate paths of flame propagation these acting to increase the area of the flame front and the collision thereof creating a great deal. The combustion speed in a combustion chamber constructed according to the present invention is so fast that the temperature of the exhaust and heat stress become greatly decreased.

During a period of high load, as a result of the fast speed of combustion, the advanced angle of ignition will be reduced. This causes some additional advantages:

1. It further helps to suppress detonation and further allows an increase in the compression ratio without detonation.

2. The maximum combustion pressure and the mechanical stress can be lowered.

3. Combustion noise can be lowered.

4. The carbon monoxide level in the exhaust can be lowered.

As compared with the prior art, the key advantage provided by the present invention is that the design compression ratio of such an engine may be raised without necessitating the use of a higher octane level gasoline therein. For example, the domestic gasoline engine model 492Q common in The People's Republic may be changed over to the TJ-jet chamber, whereby its performance may be higher than the performance of foreign gasoline engines. The fuel economy of such a modified model 492Q engine is equal to the fuel economy of the abovementioned gasoline engines having higher compression ratios which have recently been developed abroad. Premium gasoline is necessary for the operation of such recently designed foreign automobile engines, while modified engine number 492Q may be run on unleaded fuel having regular octane levels. The attached table provides a performance comparison among gasoline engines having high compression ratios with a gasoline engine provided with a TJ-jet chamber constructed according to the present invention. The attached table is based on the performance of a domestic People's Republic model 492Q gasoline engine having, in reference to the dimensions shown in FIG. 1:

$fi_1 = 50$ mm;
$fi_2 = 40$ mm; the diameter of the jet hole = 10 mm;
$a = 29.5$ mm;
$b = 15$ mm;
$c =$ to 5.5 mm;
$\alpha = 32°$ and
$\beta$ equalling 38° 30 minutes.

| | Performance Comparison Among Gasoline Engines With High Compression Ratio | | | |
|---|---|---|---|---|
| | parameter of performance | | | |
| combustion chamber | | octane number of gasoline (RON) | compression ratio | lowest specific fuel consumption (g/HP. hour) | maximum mean effective pressure (kg/cm$^2$) |
| car-used gasoline engine abroad | | 90–93 | 8.5–9.0 | 200–205 | 9–9.5 |
| May Fireball chamber in swiss | | 97 (high octame NO gasoline) | 11 | 180 | 11.4 |
| Ricardo high compression ratio | chamber in piston | 103 | 11 | 190 | 10.1 |
| compact chamber British | chamber in cylinder head | 96 | 11 | 190 | 9.5 |
| Porshe TOP chamber in F.R.G. | | 98 | 10.6 | 191 | 10.3 |
| | | 92 | 9.5 | 206 | 9.4 |

-continued

| | Performance Comparison Among Gasoline Engines With High Compression Ratio | | | |
|---|---|---|---|---|
| | parameter of performance | | | |
| combustion chamber | octane number of gasoline (RON) | compression ratio | lowest specific fuel consumption (g/HP. hour) | maximum mean effective pressure (kg/cm$^2$) |
| TJ-jet chamber | 86 | 10 | 180 | 9.7 |

We claim:

1. A cylinder head assembly for an internal combustion engine having at least one piston mounted for reciprocation within a cylinder space defined in an engine block, the cylinder space having a clearance space, comprising:

a cylinder head having a planar lower surface which is adapted to be mounted to an engine block, and having an internal combustion chamber defined therein which opens out directly into the clearance space, the shape of said chamber being substantially cylindrical, with a slight inward taper toward a lower end thereof, said chamber accounting for at least 85% of the total combined volume of the chamber and cylinder space, and further defining an axially extending jet hole bore which extends from said clearance space to said combustion chamber, an upper end of said bore being opposite an exhaust valve and a lower end being remote from an axially extending spark plug bore defined in said cylinder head that extends from the combustion chamber to an outer surface of the cylinder head;

intake valve means mounted in said cylinder head;

exhaust valve means mounted in said cylinder head parallel to said intake valve means for exhausting hot gases from the combustion chamber after combustion; and a spark plug mounted in said spark plug bore;

whereby a flame ignited by said spark plug in the combustion chamber is bifurcated into separate paths of travel to the clearance space; a first path thrugh where the combustion chamber opens out in the clearance space and a second path through the jet hole, whereby the separate flame fronts may violently collide in the clearance space, thereby providing more complete combustion and higher engine efficiency.

2. An overhead valve internal combustion engine according to claim 1 wherein the axis of said jet hole bore in the cylinder head forms an angle of between 30°–34° with said lower planar surface of the cylinder head so as to increase the level of microscale turbulence.

3. An overhead valve internal combustion engine according to claim 1 wherein the axis of said jet hole bore forms an angle of 37°–40° with a center line perpendicular to the axis of the cylinder so that a strong horizontal swirl is generated around the wall of the cylinder space, thereby speeding up combustion.

* * * * *